Patented Aug. 22, 1939

2,170,654

UNITED STATES PATENT OFFICE 2,170,654

ADHESIVE-COATED PAPER

Harold R. Dalton, Teaneck, N. J., assignor to Postal Telegraph-Cable Company (New York), New York, N. Y., a corporation of New York No Drawing. Application April 23, 1936, Serial No. 76,077

9 Claims. (Cl. 91—68)

This invention relates to new and useful improvements in adhesive coated paper, cloth or other material and pertains more particularly to a moisture protected adhesive coating for gummed tape or the like.

It has been proposed heretofore to protect adhesive coated material from the deleterious absorption of moisture from a humid atmosphere by the application of a protective soap layer. The object of the soap layer has been to prevent the penetration to the adhesive material by sufficient atmospheric moisture to render the material excessively sticky. While such coatings of soap have met with a certain degree of success in some applications, it has been found that materials so coated are undesirably slippery for certain uses. This is particularly true where the coated material is to be wound into rolls, particularly narrow rolls such as used in connection with telegraph printers. The slippery coating tends to cause difficulty in the slitting machines which slit the paper into strips and winds the strips into rolls, since the successive layers of paper tend to slip sidewise with respect to one another. This difficulty is also presented in the handling of the finished rolls of coated paper, since on account of the excessive slipperiness of the soap content the center of the rolls easily falls out, making a tangled mass, unless great care is used. Ordinary soap films are also likely to discolor paper tape when stored for any length of time.

It is an object of the present invention to provide an adhesive coating which will not become excessively sticky even when exposed to a humid atmosphere over long periods of time, thus eliminating the handling difficulties in postage stamp feeding mechanisms, sealing tape machines, telegraph printers, etc., and preventing damage to gummed material stored in humid climates.

In accordance with my invention the paper, cloth or the like is first passed through any suitable gumming machine and thereby coated with a layer of any suitable gum or adhesive. A thin uniform coating of a substance to be described below is sprayed, dusted or otherwise applied to the adhesive while the tape passes through the drying mechanism of the gumming machine so that as the coating dries the protective film will adhere firmly thereto. Alternatively the film may be applied in a separate operation.

The protective material is a gum product of starch hydrolysis intermediate between starch and the adhesive dextrins commonly used for gummed tape purposes and should not be so completely hydrolyzed as the dextrins ordinarily used for adhesive purposes, since these dextrins are not sufficiently insoluble and therefore have an undesirable affinity for atmospheric moisture.

This gum product of starch hydrolysis is one such that if it were used as the adhesive coating for gummed paper it would not form a bond exceeding the strength of the paper under ordinary conditions of use. That is, it would not form a bond, under normal conditions of temperature, and relative humidity, e. g. 70° F. and 40% respectively, when moistened in the ordinary manner, which would prevent the easy separation of the adhesive tape from ordinary bond paper without tearing.

From one half to one per cent of potato starch, cornstarch or similar starch added to one of the more insoluble type adhesive dextrins, which of itself might produce a bond in excess of the strength of the paper, produces a product similar to that obtained through limited hydrolysis and defined above as intermediate between starch and the adhesive dextrins commonly used for gummed tape purposes.

Coatings in accordance with my invention may be applied in the form of a 10% solution with water.

By utilizing a product of starch hydrolysis as defined above, it is possible to produce a coated gummed tape which has the necessary resistance to atmospheric moisture and yet is still slightly tacky so as to be suitable for winding in rolls which may be subjected to ordinary handling without the difficulties which result from the use of more slippery coatings such as certain hard soaps.

A coating of the described material protects the adhesive from contact with the users fingers and mechanical parts, such as platens of a tape feeding mechanism, etc. While the protective film is sufficiently insoluble to resist deleterious absorption of moisture from the air it is sufficiently soluble to dissolve in any directly applied water, thereby allowing the water to penetrate into and soften the adhesive coating. The water softened adhesive will then permit the sticking of the tape to the desired object. The quantity of coating material present is not sufficient to interfere with the sticking of the adhesive when deliberately wet for use. A coating of this material sprayed to the extent of one-half pound, dry weight, per 500 sheets of paper 17" x 22", over a glue film of 6.5 pounds, gave a satisfactory result by affording ample protection to the under glue coating upon exposure to humid weather conditions, while at the same time presenting a surface which was not too slippery for successful use of the material under most conditions.

I have found that gummed tape protected by a coating such as described hereinabove may be safely handled and stored for extended periods of time, even when the atmospheric relative humidity approaches 80% at 100° F.

While I have described a particular embodiment of my invention for the purposes of illustration, it should be understood that various modications and adaptations thereof may be made within the spirit of the invention as set forth in the following claims.

What I claim is:

1. As an article of manufacture, a roll of paper, a layer of hygroscopic water-soluble adhesive on one side of said paper, and superposed on said layer a slightly tacky protective layer of dextrin having admixed therewith a relatively small percentage of starch.

2. As an article of manufacture, a paper base, an adhesive coating including a layer of hygroscopic water-soluble adhesive on one side of said base and superposed upon said coating a slightly tacky protective layer consisting essentially of a less readily water-soluble product of starch hydrolysis intermediate between starch and the adhesive dextrins the adhesive strength in particular of said protective coating when used as an adhesive coating for gummed paper being such that it will not form a bond exceeding the strength of the paper under ordinary conditions of use.

3. As an article of manufacture, a paper base, an adhesive coating including a layer of hygroscopic water-soluble adhesive on one side of said base and superposed upon said coating a slightly tacky protective layer consisting essentially of a relatively insoluble product of starch hydrolysis and whose adhesive strength in particular when used as an adhesive coating for gummed paper will not form a bond exceeding the strength of the paper under ordinary conditions of use.

4. As an article of manufacture, a paper base, an adhesive coating including a layer of hygroscopic water-soluble adhesive on one side of said base, and superposed upon said coating a slightly tacky protective layer comprising dextrin having admixed therewith a relatively small percentage of starch.

5. As an article of manufacture, a paper base, an adhesive coating including a layer of hygroscopic water-soluble adhesive on one side of said base, and superposed upon said coating a slightly tacky protective layer of a material less soluble in water than said adhesive layer consisting essentially of a mixture of starches and dextrins whose physical and chemical properties are intermediate between unhydrolysed starch and the adhesive dextrins and whose adhesive strength in particular when used as an adhesive coating for gummed paper will not form a bond exceeding the strength of the paper under ordinary conditions of use.

6. As an article of manufacture, a paper base, an adhesive coating including a layer of hygroscopic water-soluble adhesive on one side of said base, and superposed upon said coating a protective layer of a material less tacky than said adhesive coating consisting essentially of a starch product, at least part of which has been hydrolysed, whose physical properties are intermediate the properties of starch and the adhesive dextrins and whose adhesive strength in particular when used as an adhesive coating for gummed paper will not form a bond exceeding the strength of the paper under ordinary conditions of use.

7. As an article of manufacture, a paper base, an adhesive coating including a layer of hygroscopic water-soluble adhesive on one side of said base, and superposed upon said coating a slightly tacky less soluble in water than said adhesive coating protective layer consisting essentially of a starch product of which more than ninety percent of the starch has been at least partially hydrolysed, the physical properties of said starch product being intermediate the properties of unhydrolysed starch and the adhesive dextrins and the adhesive strength in particular of said protective layer when used as an adhesive coating for gummed paper being such that a bond exceeding the strength of the paper under ordinary conditions will not be formed.

8. As an article of manufacture, a roll of paper, a layer of hygroscopic water-soluble adhesive on one side of said paper, and superposed on said layer a slightly tacky protective layer of dextrin having admixed therewith from one-half to one percent of starch.

9. As an article of manufacture, a paper base, an adhesive coating including a layer of hygroscopic water-soluble adhesive on one side of said paper base, and superposed on said layer a slightly tacky protective layer of a material less tacky than said adhesive coating consisting essentially of a mixture of starches and dextrins whose physical and chemical properties are intermediate between unhydrolysed starch and the adhesive dextrins and whose adhesive strength in particular when used as the adhesive coating for gummed paper under ordinary conditions of use is lower than the strength of said paper.

HAROLD R. DALTON.